US011640225B2

(12) United States Patent
Kumar et al.

(10) Patent No.: US 11,640,225 B2
(45) Date of Patent: *May 2, 2023

(54) GROUP VOLUME CONTROL

(71) Applicant: Sonos, Inc., Santa Barbara, CA (US)

(72) Inventors: Abhishek Kumar, Santa Barbara, CA (US); Mike Lemmon, Seattle, WA (US); Stephanie Hughes, Seattle, WA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/827,469

(22) Filed: Mar. 23, 2020

(65) Prior Publication Data
US 2021/0042011 A1 Feb. 11, 2021

Related U.S. Application Data

(63) Continuation of application No. 14/205,347, filed on Mar. 11, 2014, now Pat. No. 10,599,287.

(51) Int. Cl.
G06F 3/048 (2013.01)
G06F 3/04817 (2022.01)
(Continued)

(52) U.S. Cl.
CPC ...... G06F 3/04817 (2013.01); G06F 3/04847 (2013.01); G06F 3/165 (2013.01);
(Continued)

(58) Field of Classification Search
CPC .. G06F 3/04817; G06F 3/165; G06F 3/04847; H04L 67/025; H04L 67/10; H04W 4/08
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

EP 1389853 A1 2/2004
WO 200153994 7/2001
WO 2003093950 A2 11/2003

OTHER PUBLICATIONS

Advisory Action dated Jul. 23, 2018, issued in connection with U.S. Appl. No. 14/205,347, filed Mar. 11, 2014, 3 pages.
(Continued)

Primary Examiner — Haoshian Shih
(74) Attorney, Agent, or Firm — Akerman LLP

(57) ABSTRACT

An example method involves providing an interface that simultaneously displays an indication of a respective volume corresponding to each of at least two zone players and displays a respective selectable icon corresponding to each of the at least two zone players. Each respective selectable icon indicates whether the corresponding zone player has been selected for a group, and at least one of the respective selectable icons indicates that a respective zone player has been selected for the group. The interface further displays an indication of a group volume associated with the at least one selected zone player. The method further includes receiving a command to change at least one of a respective volume of one or more of the at least one selected zone player or the group volume, and transmitting an indication of the received command to one or more of the at least one selected zone player.

20 Claims, 11 Drawing Sheets

(51) Int. Cl.
  *G06F 3/04847* (2022.01)
  *H04L 67/10* (2022.01)
  *G06F 3/16* (2006.01)
  *H04W 4/08* (2009.01)
  *H04L 67/025* (2022.01)

(52) U.S. Cl.
  CPC ............ *H04L 67/025* (2013.01); *H04L 67/10* (2013.01); *H04W 4/08* (2013.01)

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,256,554 B1 | 7/2001 | Dilorenzo |
| 6,404,811 B1 | 6/2002 | Cvetko et al. |
| 6,469,633 B1 | 10/2002 | Wachter et al. |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,319,764 B1 | 1/2008 | Reid et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,672,470 B2 | 3/2010 | Lee |
| 7,853,341 B2 | 12/2010 | McCarty et al. |
| 7,987,294 B2 | 7/2011 | Bryce et al. |
| 3,014,423 A1 | 9/2011 | Thaler et al. |
| 8,045,952 B2 | 10/2011 | Qureshey et al. |
| 8,103,009 B2 | 1/2012 | McCarty et al. |
| 8,218,790 B2 | 7/2012 | Bull et al. |
| 8,234,395 B2 | 7/2012 | Millington |
| 8,483,853 B1 | 7/2013 | Lambourne |
| 8,611,559 B2 | 12/2013 | Sanders |
| 8,885,851 B2 | 11/2014 | Westenbroek |
| 8,917,877 B2 | 12/2014 | Haaff et al. |
| 8,917,888 B2 | 12/2014 | Nakamura |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2007/0142944 A1 | 6/2007 | Goldberg et al. |
| 2012/0051560 A1 | 3/2012 | Sanders |
| 2014/0075311 A1 | 3/2014 | Boettcher et al. |
| 2014/0328499 A1 | 11/2014 | Galano et al. |

OTHER PUBLICATIONS

Advisory Action dated May 24, 2019, issued in connection with U.S. Appl. No. 14/205,347, filed Mar. 11, 2014, 3 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Final Office Action dated Jul. 13, 2016, issued in connection with U.S. Appl. No. 14/205,347, filed Mar. 11, 2014, 6 pages.
Final Office Action dated May 16, 2018, issued in connection with U.S. Appl. No. 14/205,347, filed Mar. 11, 2014, 14 pages.
Final Office Action dated Feb. 24, 2017, issued in connection with U.S. Appl. No. 14/205,347, filed Mar. 11, 2014, 13 pages.
Final Office Action dated Mar. 6, 2019, issued in connection with U.S. Appl. No. 14/205,347, filed Mar. 11, 2014, 13 pages.
First Action Interview Office Action dated Mar. 31, 2016, issued in connection with U.S. Appl. No. 14/205,347, filed Mar. 11, 2014, 23 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Nov. 2, 2016, issued in connection with U.S. Appl. No. 14/205,347, filed Mar. 11, 2014, 12 pages.
Non-Final Office Action dated Aug. 9, 2017, issued in connection with U.S. Appl. No. 14/205,347, filed Mar. 11, 2014, 14 pages.
Non-Final Office Action dated Nov. 9, 2018, issued in connection with U.S. Appl. No. 14/205,347, filed Mar. 11, 2014, 12 pages.
Notice of Allowance dated Nov. 12, 2019, issued in connection with U.S. Appl. No. 14/205,347, filed Mar. 11, 2014, 7 pages.
Palm, Inc., "Handbook for the Palm VII Handheld," May 2000, 311 pages.
Pre-Interview Office Action dated Dec. 10, 2015, issued in connection with U.S. Appl. No. 14/205,347, filed Mar. 11, 2014, 15 pages.
Presentations at WinHEC 2000, May 2000, 138 pages.
Sonos Controller for Android Smartphones Product Guide, Sonos, Inc., 2014.
Sonos Controller for Android Tablets Product Guide, Sonos, Inc., 2014.
Sonos Controller for iPad Product Guide, Sonos, Inc., 2014.
Sonos Controller for iPhone Product Guide, Sonos, Inc., 2014.
Sonos Controller for Mac or PC Product Guide, Sonos, Inc., 2013.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
U.S. Appl. No. 13/904,896, filed May 29, 2013, "Playback queue control via a playlist on a mobile device" Kumar et al.
U.S. Appl. No. 13/904,909, filed May 29, 2013, "Playback Queue Control Transition" Kumar et al.
U.S. Appl. No. 13/904,923, filed May 29, 2013, "Connected State Indicator" Kumar et al.
U.S. Appl. No. 13/904,932, filed May 29, 2013, "Moving a Playback Queue to a New Zone" Kumar et al.
U.S. Appl. No. 13/904,936, filed May 29, 2013, "Private Queue Indicator" Kumar et al.
U.S. Appl. No. 13/904,944, filed May 29, 2013, "Playlist Modification" Kumar et al.
U.S. Appl. No. 13/904,949, filed May 29, 2013, "Playback Zone Silent Connect" Kumar et al.
U.S. Appl. No. 14/194,257, filed Feb. 28, 2014, "Playback Zone Representations" Kumar et al.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

GROUP VOLUME CONTROL

CROSS REFERENCE TO RELATED APPLICATIONS

This application is a continuation of application Ser. No. 14/205,347, titled "Group Volume Control", filed Mar. 11, 2014, and currently pending. The entire contents of the Ser. No. 14/205,347 application is incorporated herein by reference for all purposes.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
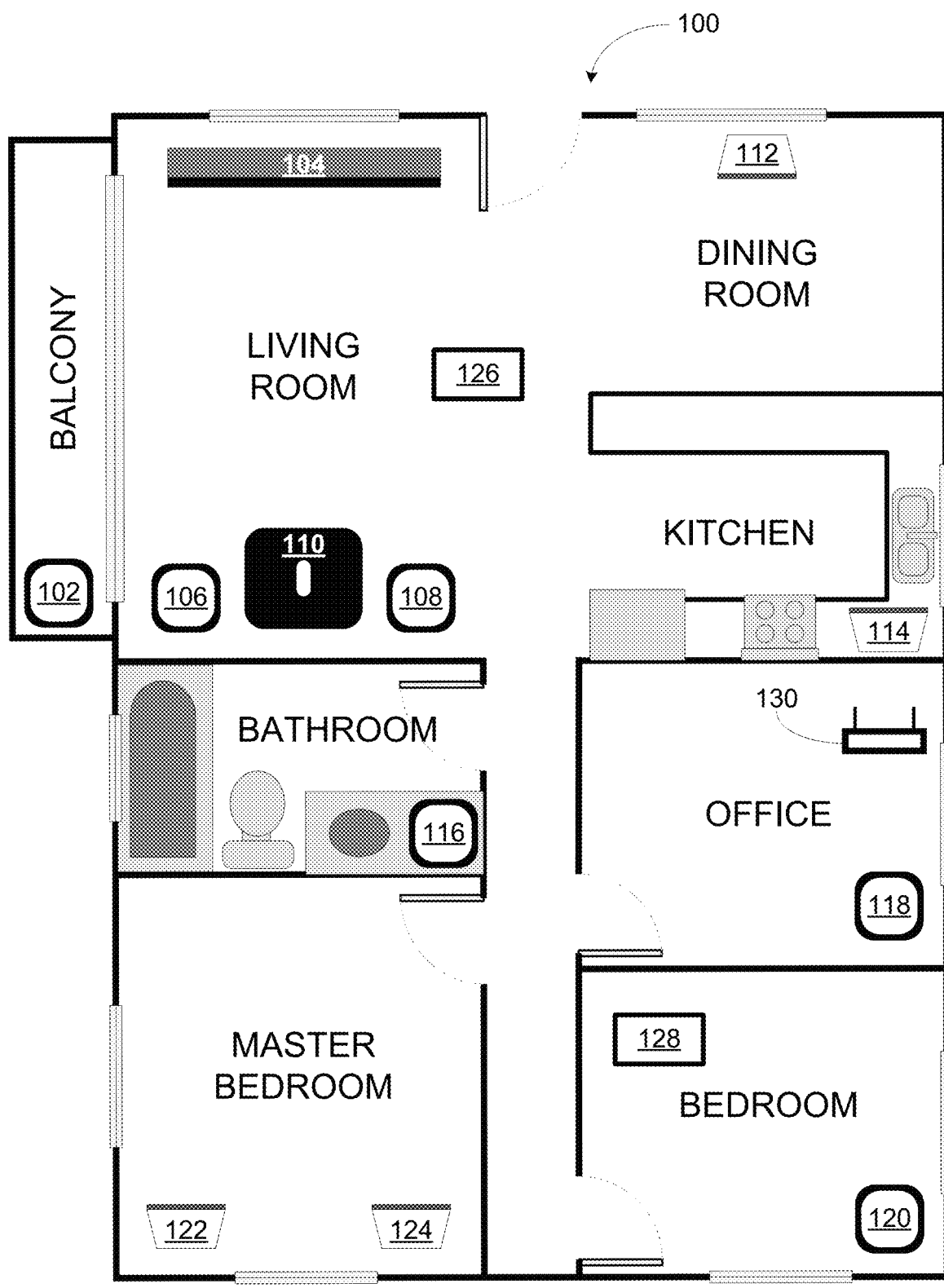
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein involve, among other things, providing access to and control of a media playback network via a media playback application. The embodiments further involve providing the capability to form playback groups of zone players, from within the media playback application or from a user interface that is accessible from the media playback application. And the embodiments further involve providing for the control of playback volumes associated with the zone players, from within the media playback application or from a user interface accessible from the media playback application. In some embodiments, such control of playback volumes of zone players within a playback group may be controlled before the playback group is formed. Other aspects of the embodiments will be made apparent in the remainder of description herein.

In one aspect, a method is provided. The method involves providing a user interface that simultaneously (i) displays an indication of a respective volume corresponding to each of at least two zone players and (ii) displays a respective selectable icon corresponding to each of the at least two zone players. Each respective selectable icon indicates whether the corresponding zone player has been selected for a group, and at least one of the respective selectable icons indicates that a respective zone player has been selected for the group. The interface further simultaneously displays (iii) an indication of a group volume associated with the at least one selected zone player. The method further includes receiving a command to change either at least one of (i) a respective volume of one or more of the at least one selected zone player or (ii) the group volume, and transmitting an indication of the received command to one or more of the at least one selected zone player.

In another aspect, a device is provided. The device includes a processor and memory with instructions stored therein, that when executed cause the device to perform functions. The functions comprise providing a user interface that simultaneously (i) displays an indication of a respective volume corresponding to each of at least two zone players and (ii) displays a respective selectable icon corresponding to each of the at least two zone players. Each respective selectable icon indicates whether the corresponding zone player has been selected for a group, and at least one of the respective selectable icons indicates that a respective zone player has been selected for the group. The interface further simultaneously displays (iii) an indication of a group volume associated with the at least one selected zone player. The functions further comprise receiving a command to change at least one of (i) a respective volume of one or more of the at least one selected zone player or (ii) the group volume. The functions further comprise transmitting an indication of the received command to one or more of the at least one selected zone player.

In yet another aspect, a non-transitory computer readable memory is provided. The non-transitory computer readable memory has stored thereon instructions executable by a computing device to cause the computing device to perform functions. The functions comprise providing a user interface that simultaneously (i) displays an indication of a respective volume corresponding to each of at least two zone players and (ii) displays a respective selectable icon corresponding to each of the at least two zone players. Each respective selectable icon indicates whether the corresponding zone player has been selected for a group, and at least one of the respective selectable icons indicates that a respective zone player has been selected for the group. The interface further simultaneously displays (iii) an indication of a group volume associated with the at least one selected zone player. The functions further comprise receiving a command to change at least one of (i) a respective volume of one or more of the at least one selected zone player or (ii) the group volume. The functions further comprise transmitting an indication of the received command to one or more of the at least one selected zone player.

In yet another aspect, a method is provided. The method involves receiving a selection of at least two zone players to be included in a group and causing a graphical interface to display (i) an indication of a respective volume of each of the at least two selected zone players and (ii) an indication of a group volume associated with the at least two selected zone players. The method further involves, subsequent to causing the graphical interface to display the indications, receiving a command to form the group of the at least two selected zone players; and transmitting a command to each of the at least two selected zone players to synchronously play a portion of media content.

In another aspect, a device is provided. The device includes a processor and memory with instructions stored therein, that when executed cause the device to perform functions. The functions comprise receiving a selection of at least two zone players to be included in a group and causing a graphical interface to display (i) an indication of a respective volume of each of the at least two selected zone players and (ii) an indication of a group volume associated with the at least two selected zone players. The functions comprise, subsequent to causing the graphical interface to display the indications, receiving a command to form the group of the at least two selected zone players; and transmitting a command to each of the at least two selected zone players to synchronously play a portion of media content.

In yet another aspect, a non-transitory computer readable memory is provided. The non-transitory computer readable memory has stored thereon instructions executable by a computing device to cause the computing device to perform functions. The functions comprise receiving a selection of at least two zone players to be included in a group and causing a graphical interface to display (i) an indication of a respective volume of each of the at least two selected zone players and (ii) an indication of a group volume associated with the at least two selected zone players. The functions further comprise, subsequent to causing the graphical interface to display the indications, receiving a command to form the group of the at least two selected zone players; and transmitting a command to each of the at least two selected zone players to synchronously play a portion of media content.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
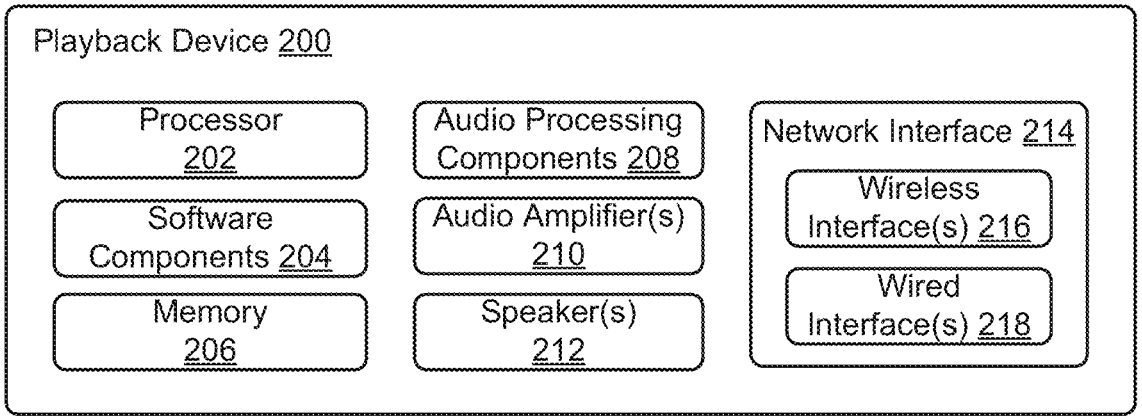
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
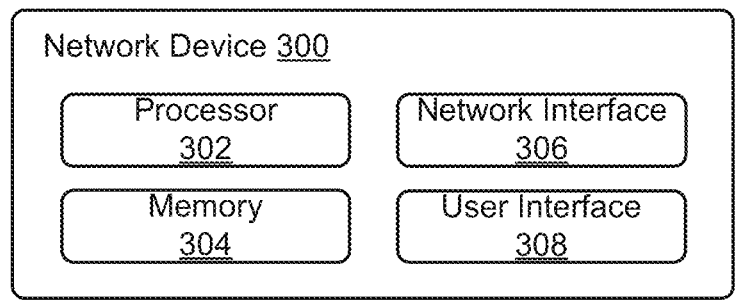
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
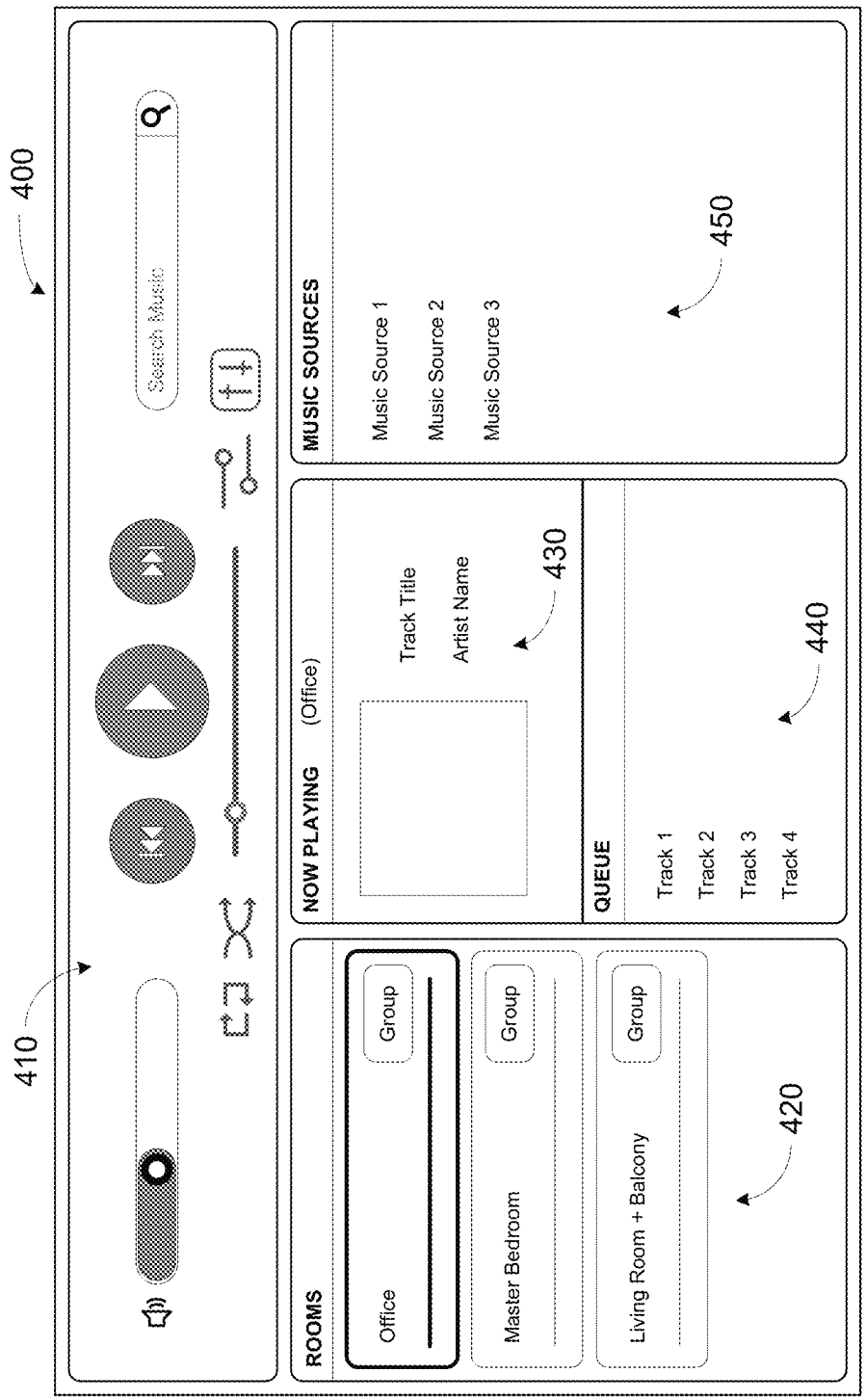
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for group and ungroup zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods

As discussed above, embodiments described herein involve, among other things, providing access to and control of a media playback network via a media playback application. The embodiments further involve providing the capability to form playback groups of zone players, from within the media playback application or from a user interface that is accessible from the media playback application. And the embodiments further involve providing for the control of playback volumes associated with the zone players, from within the media playback application or from a user interface accessible from the media playback application. In some embodiments, such control of playback volumes of zone players within a playback group may be controlled before the playback group is formed. Other aspects of the embodiments will be made apparent in the remainder of description herein.

Figure 5:
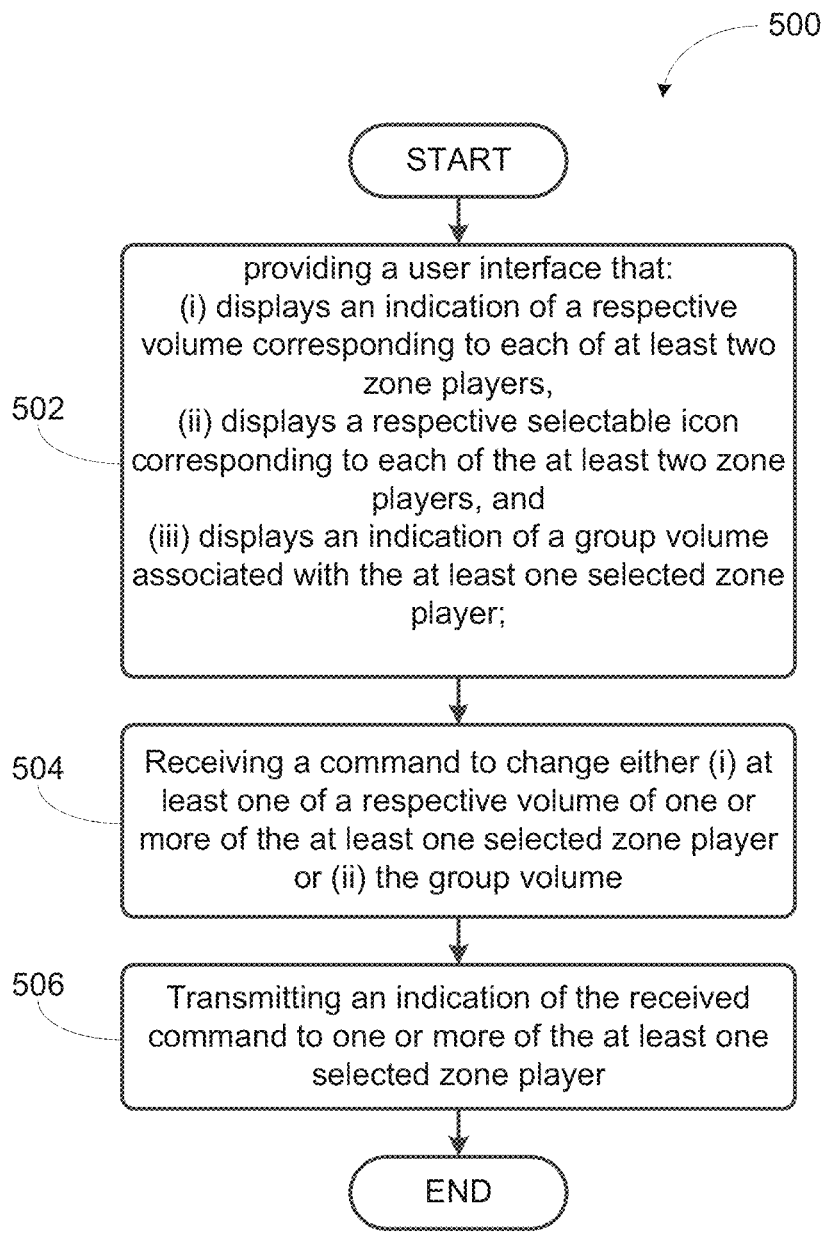
FIG. 5 shows an example flow diagram for an example method.

Method 500 shown in FIG. 5 presents an embodiment of a method that can be implemented within an operating environment involving, for example, the media playback system 100 of FIG. 1, one or more of the playback device 200 of FIG. 2, and one or more of the control device 300 of FIG. 3. Method 500 may include one or more operations, functions, or actions as illustrated by one or more of blocks 502-506. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

Figure 7:
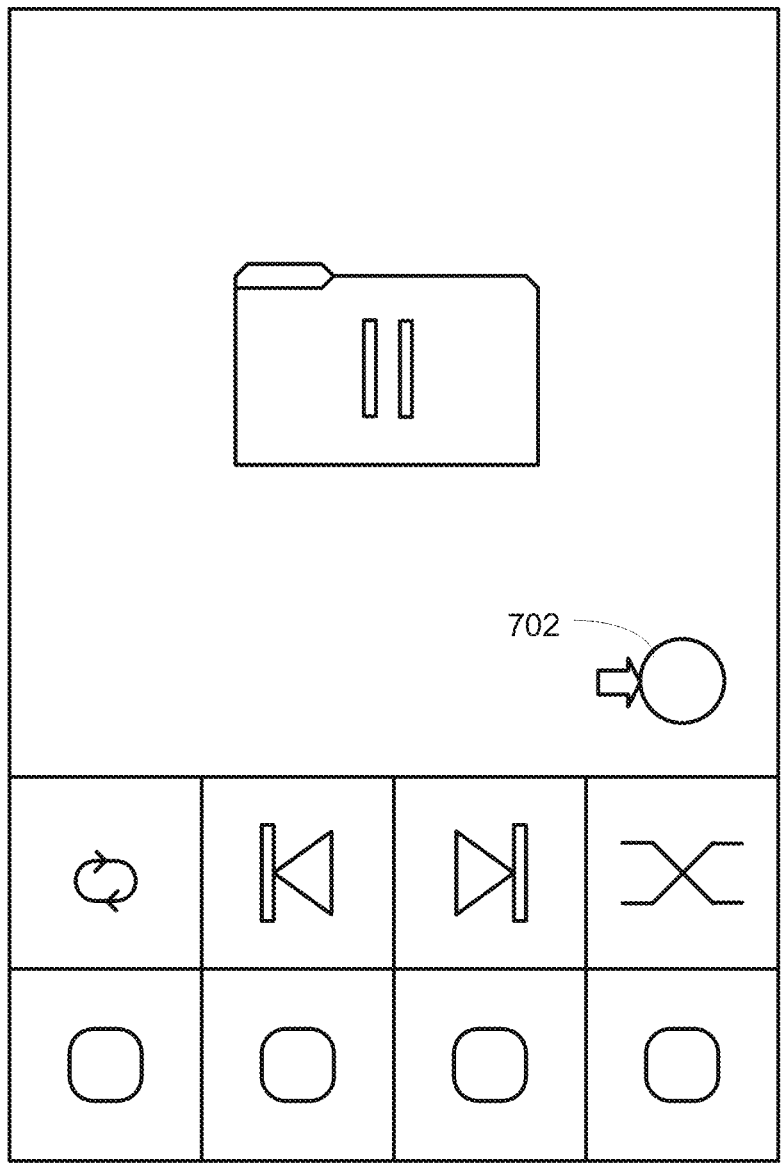
FIGS. 7, 8, 9, 10, 11, and 12 show example displays.

It should be understood that, before initiating method 500 (i.e., commencing performance of block 502), a device may cause a user interface to display a user interface having features such as that depicted in FIG. 7. FIG. 7 may be understood to represent a display associated with a media playback application. Such a media player application may be associated with a given playback device or network of playback devices, or may be independent of such a playback device or network of playback devices (i.e., it may be a "third party" application). The display such as that shown in FIG. 7 may include a number of features such as an indication of a media item, playback controls, and other features. The display may also include an activation icon 702. Upon a user touching or clicking the activation icon 702, the device may enter a state in which the device may display any of the displays of FIGS. 8-12, among other example displays. The user interface depicted in FIG. 7 may include other features and/or be arranged to perform other functions as well.

It should be noted that any of the displays depicted in FIGS. 8-12 can be displayed by a user interface as part of, or otherwise integrated into, a third-party media playback application, or may be part of a separate application that is launched upon the user clicking or touching the activation icon 702. Also, after navigating the displays represented by any of FIGS. 8-12, the controller device may revert back to displaying a display in accordance with the media playback application (e.g. the display of FIG. 7, or a similar display). The revision to the media playback application may occur automatically after completing operations described herein with regard to FIGS. 8-12, or may occur based on user input (e.g. a back command). Other examples are possible.

Figure 8:
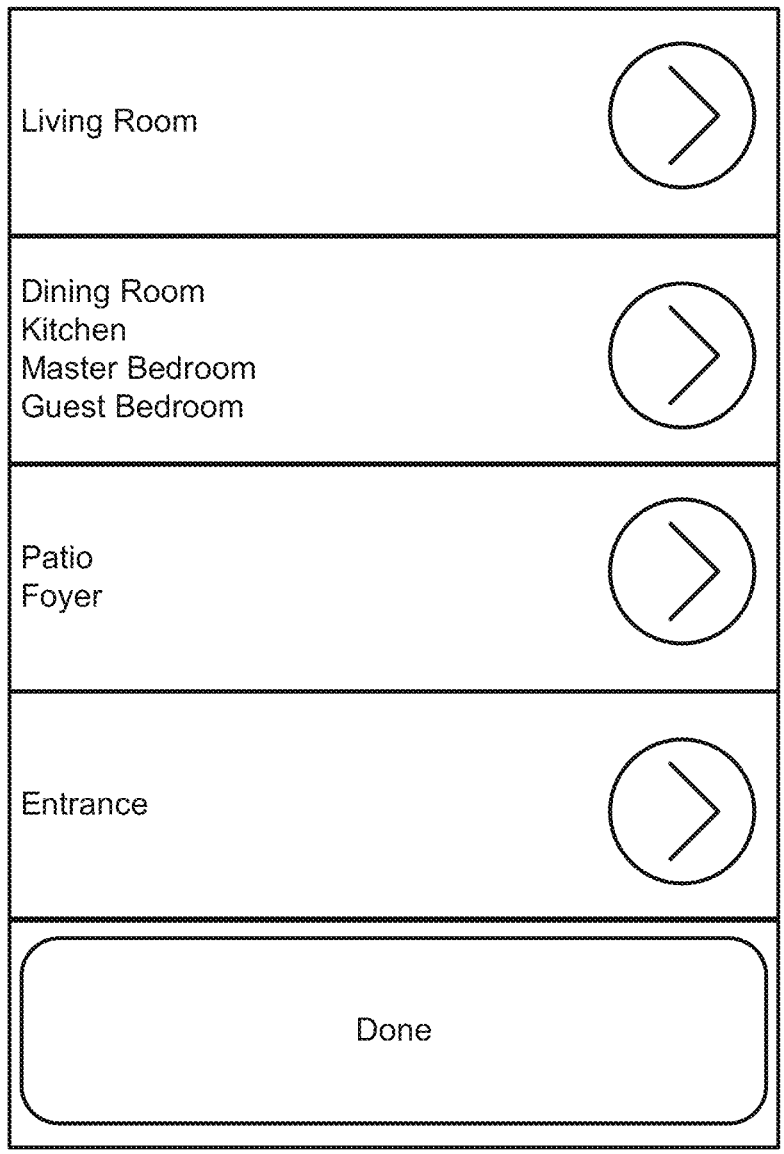

FIG. 8 depicts a display of multiple groups of zone players. For example, a first group may include a zone player associated with or located in a living room. A second group may include zone players associated with or located in a dining room, a kitchen, a master bedroom, and a guest bedroom. A third group may include zone players associated with or located in a patio and a foyer. A fourth group may include a zone player associated with or located in an entrance. Other such example groups may exist.

Figure 9:
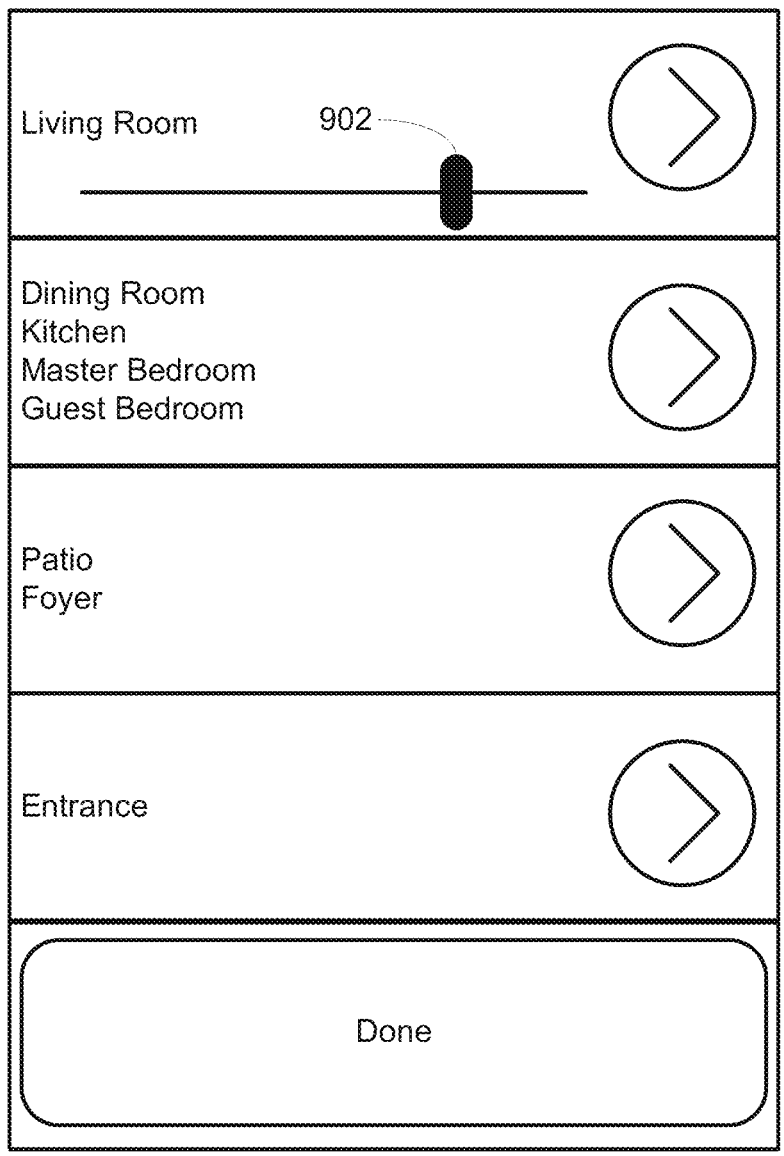

A user selecting a segment of the display associated with the living room group may cause a volume indication associated with the living room group to appear, as shown in FIG. 9. In turn, a user may touch and drag a volume slider 902 to increase or decrease the volume associated with the living room group of zone players.

At block 502(i), method 500 includes providing a user interface that displays an indication of a respective volume corresponding to each of at least two zone players. The zone player of block 502(i) may be similar to any playback device described herein.

Figure 11:
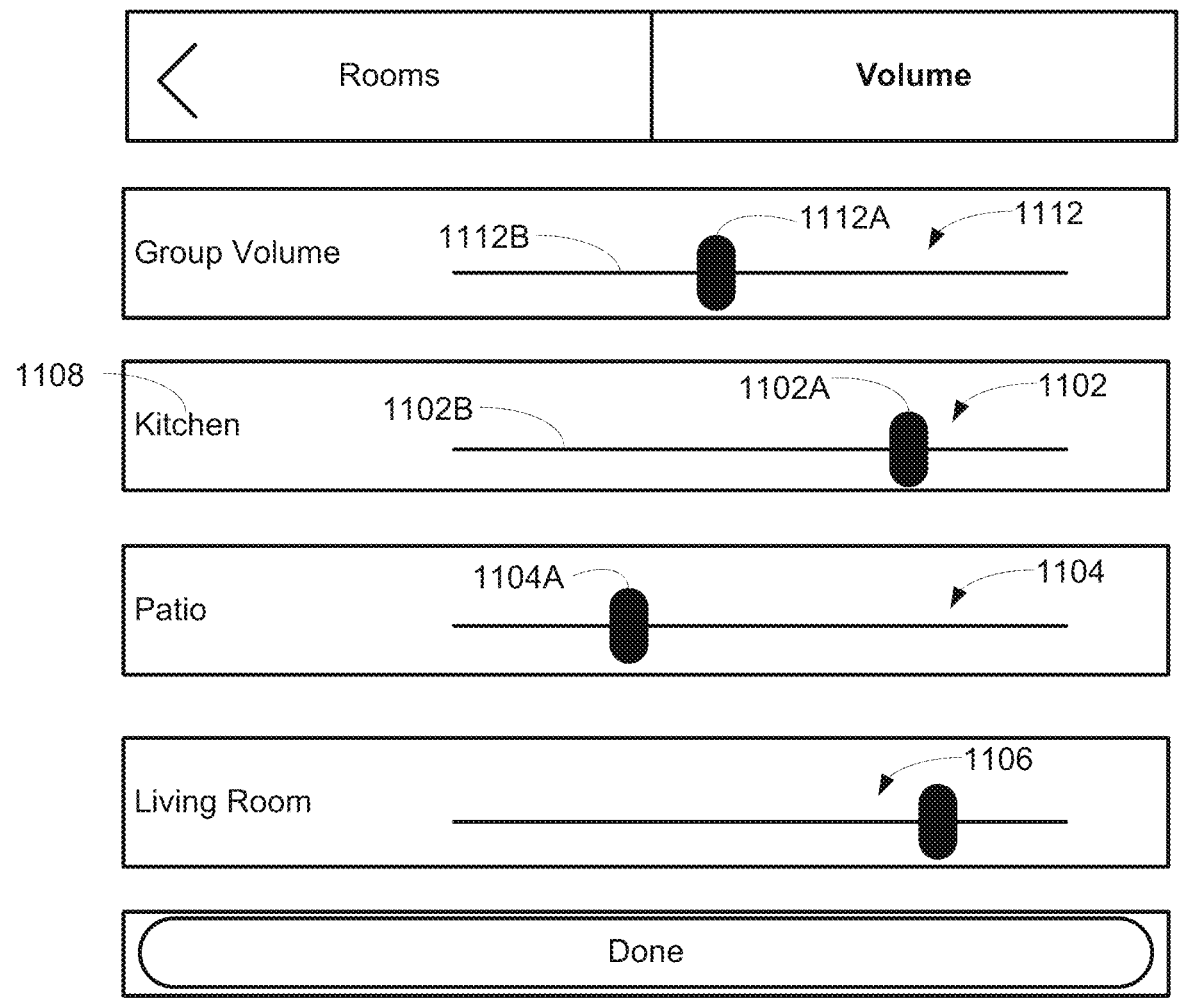

In accordance with block 502(i), FIG. 11 depicts example indications of respective volumes corresponding to three zone players including a kitchen zone, a patio zone, and a living room zone. Volume indication 1102 includes volume slider 1102A and volume indicator bar 1102B. Volume slider 1102A and volume indicator bar 1102B function together to indicate a relative volume of a zone player associated with a kitchen playback zone. For example, if volume indicator bar 1102B indicates a potential range of volumes ranging from 0-100%, volume slider 1102A lies upon volume indicator bar 1102B at a position that indicates the current volume of the kitchen playback zone is approximately 75%.

Figure 12:
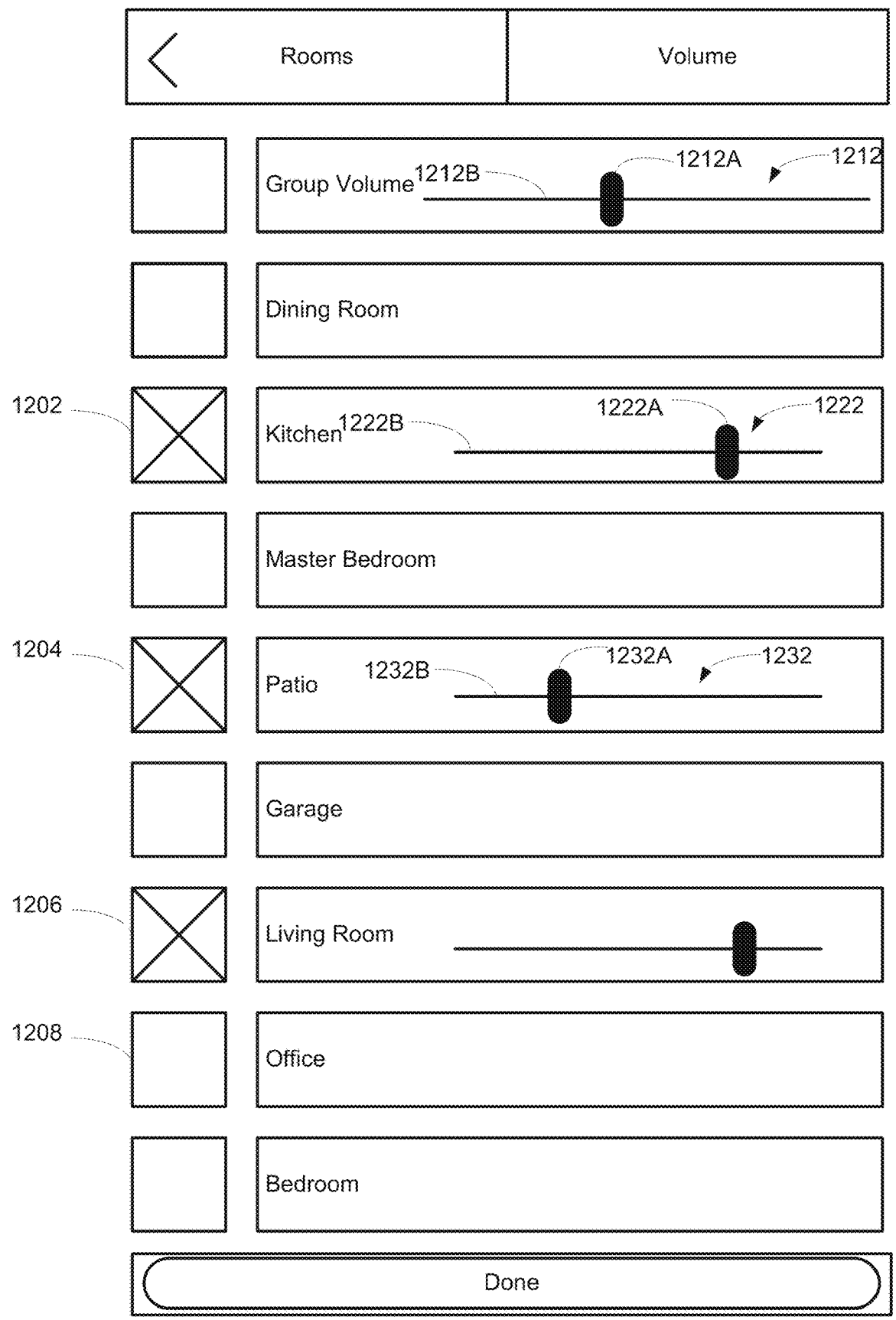

The volume indications 1104 and 1106, corresponding to a patio playback zone and a living room playback zone may respectively, indicate volumes of approximately 30% and 80%. FIG. 11 includes a zone player identifier 1108, which may indicate a room that a corresponding zone player is located in or otherwise associated with. FIG. 12 includes similar example volume indications 1222 and 1232 that may function in a manner similar to volume indications 1102 and 1104 of FIG. 11.

At block 502(ii) the method includes providing a user interface that displays a respective selectable icon corresponding to each of the at least two zone players. Each respective selectable icon indicates whether the corresponding zone player has been selected for a group and at least one of the respective selectable icons indicates that a respective zone player has been selected for the group.

Figure 10:
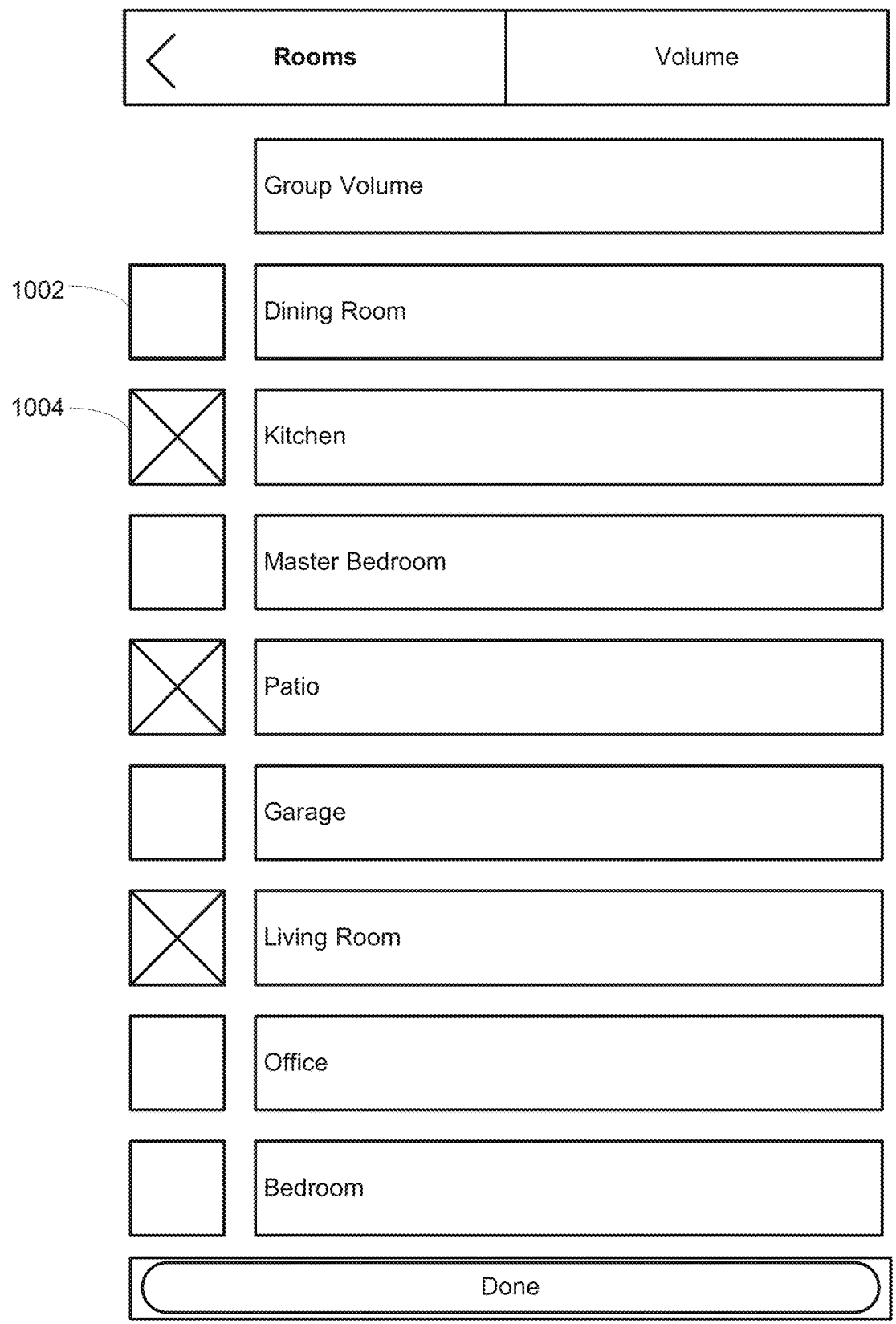

For example, FIG. 10 depicts example selectable icons corresponding to eight zone players. By way of illustration, icon 1002 corresponds to a dining room zone player and icon 1004 corresponds to a kitchen zone player. Icon 1002 indicates that the dining room zone player has not been selected for a group, while icon 1004 indicates that the kitchen zone player has been selected for the group. The display of FIG. 10 may appear on a touchscreen of a controller device, enabling a user to toggle or select any of the icons. For example, if a user were to touch the icon 1002, indicating a selection of the dining room zone player for inclusion in the group, the icon 1002 may change states to appear "checked," similar to the appearance of icon 1004 in FIG. 10. Similarly, if the user were to click or touch icon 1004, the icon 1004 may change states to "unchecked" (i.e. deselected) and may indicate that the kitchen zone player is no longer included in the group. (For example, if the icon 1004 is deselected, adjustments to the group volume may leave the volume of the kitchen zone player unaffected.) FIG. 12 includes similar selectable icons 1202, 1204, and 1206 that may function in a similar manner.

At block 502(iii) the method includes providing a user interface that displays an indication of a group volume associated with the at least one selected zone player. FIG. 11 depicts an example indication of a group volume. Group volume indication 1112 includes group volume slider 1112A and group volume indicator bar 1112B. Group volume slider 1112A and group volume indicator bar 1112B function together to indicate a relative group volume of selected zone players. For example, if group volume indicator bar 1112B indicates a potential range of volumes ranging from 0-100%, group volume slider 1112A lies upon volume indicator bar 1112B at a position that indicates the current group volume of the selected playback zones is approximately 40%. FIG. 12 includes a similar group volume indication 1212 that may function in a similar manner.

In one embodiment, the indications of volumes of zone players and the selectable icons (i.e., the displays discussed above with respect to block 502(i-iii)) may be displayed simultaneously. For example, FIG. 12 includes group volume indication 1212, volume indications 1222 and 1232, and also selectable icons 1202, 1204, and 1206. Selectable icons 1202, 1204, and 1206 indicate that the zone player respectively corresponding to the kitchen, patio, and living room are selected for inclusion in the group while the volumes of the respective zone players are simultaneously indicated by the volume indications. By way of illustration, selectable icon 1208 indicates that a zone player associated with an office is not included in the group.

At block 504, the method includes receiving a command to change at least one of (i) a respective volume of one or more of the at least one selected zone player or (ii) the group volume. For example, a user may be able to manipulate a touchscreen of a controller device to change a volume of a selected zone player or to change a group volume. Referring to FIG. 11, the user may touch volume slider 1102A and drag it to the left, causing a reduction in a volume associated with the kitchen zone player. Likewise, dragging volume slider 1102A to the right may increase the volume of the kitchen zone player. Also, the user may touch and drag group volume slider 1112A to the left or to the right, to cause a respective increase or decrease in the group volume. In other embodiments, the user may change volumes by clicking and dragging the volume sliders via a mouse. Other examples are possible.

Prior to receiving the command in accordance with block 504, the controller device may receive a selection of the at least one selected zone player. In the example shown in FIG. 11, selections may have been received corresponding to the kitchen, patio, and living room zone players.

FIG. 12 may include volume sliders 1222A and 1232A that function in a manner similar to 1102A and 1104A.

At block 506, the method includes transmitting an indication of the received command to one or more of the at least one selected zone player. Referring to the example of FIG. 11, transmitting the indication of the received command may occur in response to a user clicking or touching the "Done" button of the user interface. The controller device may transmit the command to the zone players that are affected by the command received at block 504. For example, if, prior to touching the "done" button, a user drags volume slider 1102A and a volume slider 1104A, indications of those received commands will be transmitted, by the controller device, to the kitchen and patio zone players, respectively. Likewise, if the user drags the group volume slider 1112A prior to clicking the "done" button, respective volumes corresponding to each of the kitchen, patio, and living room zone players may be increased or decreased proportionally according to the received command. FIG. 12 includes a "Done" button that may function in a similar manner, causing transmission of commands pertaining to selected zone players. Other examples of causing the indication of the received command to be transmitted may exist.

The method may further include displaying the indication of the respective volume corresponding to each of the at least two zone players prior to displaying the respective selectable icons corresponding to each of the at least two zone players. For example, if the user interface is in a state such that it is displaying the arrangement of FIG. 11, the user may click the "Rooms" button to cause the user interface to display the arrangement of FIG. 10. In another embodiment, the selectable icons and the indications of volume corresponding to the at least two zone players may be displayed simultaneously, such as in FIG. 12.

The method may further include receiving a command to form the group with two or more of the at least two zone players and transmitting a command, to the two or more zone players, to form the group. In some embodiments, the user clicking or touching the "Done" button of FIG. 10-12 may indicate to form a group with the selected zone players and for the group to synchronously playback media content. This may occur upon the controller transmitting the command to form the group to the at least two zone players.

Figure 6:
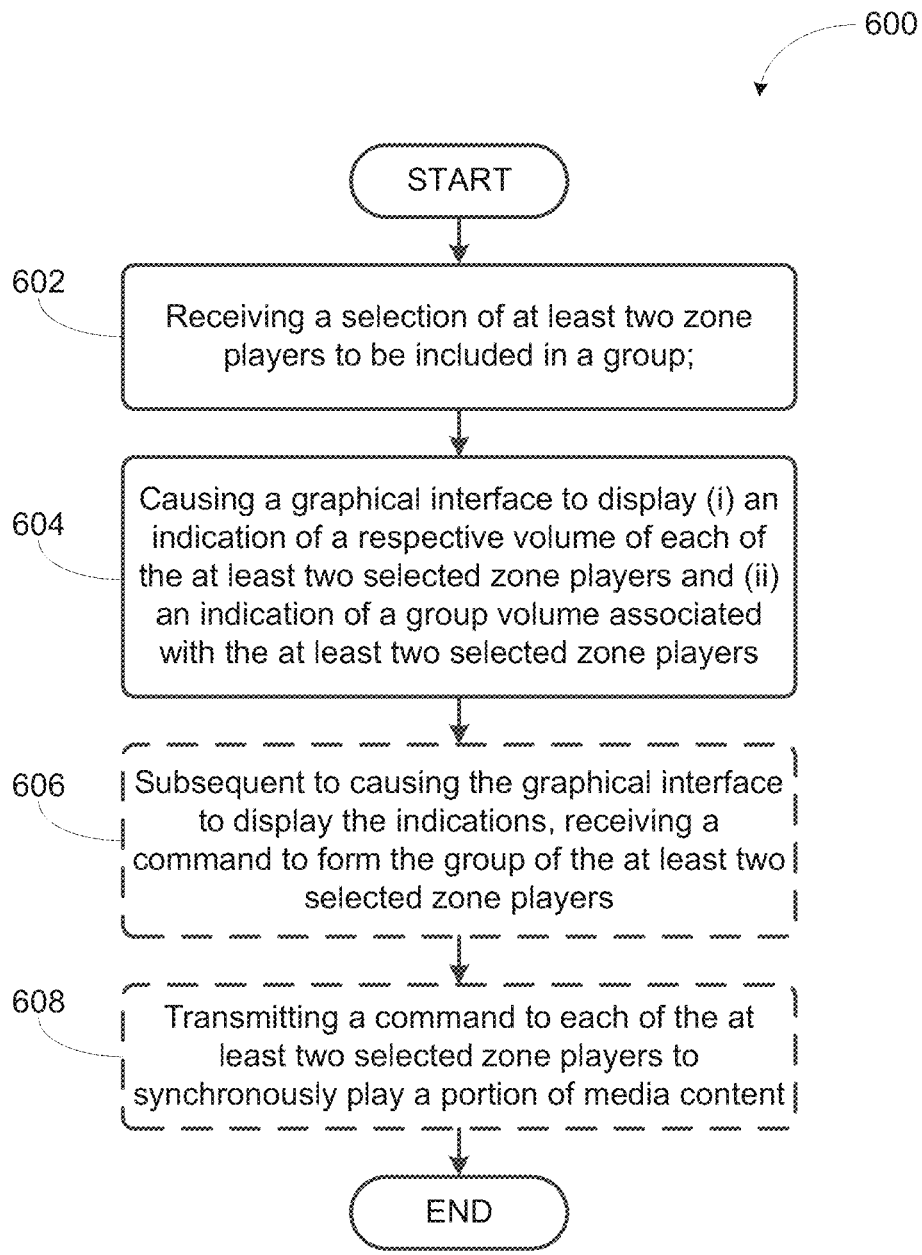
FIG. 6 shows an example flow diagram for an example method.

Method 600 shown in FIG. 6 presents an embodiment of a method that can be implemented within an operating environment involving, for example, the media playback system 100 of FIG. 1, one or more of the playback device 200 of FIG. 2, and one or more of the control device 300 of FIG. 3. Method 600 may include one or more operations, functions, or actions as illustrated by one or more of blocks 602-608. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, method 600 may include receiving a selection of at least two zone players to be included in a group. For example, referring to FIG. 12, a user may click or touch selectable icons such as icons 1202 or 1204 to select or deselect zone players associated with a kitchen and a patio, respectively.

At block 604, the method may include causing a graphical interface to display (i) an indication of a respective volume of each of the at least two selected zone players and (ii) an indication of a group volume associated with the at least two selected zone players. For example, a controller device may display an arrangement such as that depicted in FIG. 12. FIG. 12 includes volume indications 1222 and 1232, and group volume indication 1212.

At optional block 606, the method may include, subsequent to causing the graphical interface to display the indications, receiving a command to form the group of the at least two selected zone players. For example, a user may command that the group be formed by clicking or touching the "Done" button of FIG. 12. In this case, a group including zone players associated with the kitchen, the patio, and the living room would be formed as the group.

At optional block 608, the method may include transmitting a command to each of the at least two selected zone players to synchronously play a portion of media content. This may occur in response to receiving the command to form the group. That is, groups of zone players may be configured to collectively play back a portion of media content synchronously. Synchronous play of the portion of media content may include multiple zone players playing a common portion of media content so that there is no delay or lag between the zone players.

The method may also include forming the group of the at least two zone players. For example, the zone players that make up the group may be caused to sync and collectively play a common portion of media content for synchronous playback.

The method may also include receiving a command to change a respective volume of at least one of the at least two selected zone players. For example, the user may touch and drag volume slider 1232A, indicating to change the volume corresponding to the patio zone player, perhaps before, or perhaps contemporaneous with, providing the command to form the group or to synchronously play the portion of media content. The command to change the volume of at least one of the at least two selected zone players may be transmitted to the respective zone players of which the user wishes to change volumes.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

In one aspect, a method is provided. The method involves providing a user interface that simultaneously (i) displays an indication of a respective volume corresponding to each of at least two zone players and (ii) displays a respective selectable icon corresponding to each of the at least two zone players. Each respective selectable icon indicates whether the corresponding zone player has been selected for a group, and at least one of the respective selectable icons indicates that a respective zone player has been selected for the group. The interface further simultaneously displays (iii) an indication of a group volume associated with the at least one selected zone player. The method further includes receiving a command to change at least one of (i) a respective volume of one or more of the at least one selected zone player or (ii) the group volume, and transmitting an indication of the received command to one or more of the at least one selected zone player.

In another aspect, a device is provided. The device includes a processor and memory with instructions stored therein, that when executed cause the device to perform functions. The functions comprise providing a user interface that simultaneously (i) displays an indication of a respective volume corresponding to each of at least two zone players and (ii) displays a respective selectable icon corresponding to each of the at least two zone players. Each respective selectable icon indicates whether the corresponding zone player has been selected for a group, and at least one of the respective selectable icons indicates that a respective zone player has been selected for the group. The interface further simultaneously displays (iii) an indication of a group volume associated with the at least one selected zone player. The functions further comprise receiving a command to change at least one (i) of a respective volume of one or more of the at least one selected zone player or (ii) the group volume. The functions further comprise transmitting an indication of the received command to one or more of the at least one selected zone player.

In yet another aspect, a non-transitory computer readable memory is provided. The non-transitory computer readable memory has stored thereon instructions executable by a computing device to cause the computing device to perform functions. The functions comprise providing a user interface that simultaneously (i) displays an indication of a respective volume corresponding to each of at least two zone players and (ii) displays a respective selectable icon corresponding to each of the at least two zone players. Each respective selectable icon indicates whether the corresponding zone player has been selected for a group, and at least one of the respective selectable icons indicates that a respective zone player has been selected for the group. The interface further simultaneously displays (iii) an indication of a group volume associated with the at least one selected zone player. The functions further comprise receiving a command to change at least one of (i) a respective volume of one or more of the at least one selected zone player or (ii) the group volume. The functions further comprise transmitting an indication of the received command to one or more of the at least one selected zone player.

In yet another aspect, a method is provided. The method involves receiving a selection of at least two zone players to be included in a group and causing a graphical interface to display (i) an indication of a respective volume of each of the at least two selected zone players and (ii) an indication of a group volume associated with the at least two selected zone players. The method further involves, subsequent to causing the graphical interface to display the indications, receiving a command to form the group of the at least two selected zone players; and transmitting a command to each of the at least two selected zone players to synchronously play a portion of media content.

In another aspect, a device is provided. The device includes a processor and memory with instructions stored therein, that when executed cause the device to perform functions. The functions comprise receiving a selection of at least two zone players to be included in a group and causing a graphical interface to display (i) an indication of a respective volume of each of the at least two selected zone players and (ii) an indication of a group volume associated with the at least two selected zone players. The functions further comprise, subsequent to causing the graphical interface to display the indications, receiving a command to form the group of the at least two selected zone players; and transmitting a command to each of the at least two selected zone players to synchronously play a portion of media content.

In yet another aspect, a non-transitory computer readable memory is provided. The non-transitory computer readable memory has stored thereon instructions executable by a computing device to cause the computing device to perform functions. The functions comprise receiving a selection of at least two zone players to be included in a group and causing a graphical interface to display (i) an indication of a respective volume of each of the at least two selected zone players and (ii) an indication of a group volume associated with the at least two selected zone players. The functions further comprise, subsequent to causing the graphical interface to display the indications, receiving a command to form the group of the at least two selected zone players; and transmitting a command to each of the at least two selected zone players to synchronously play a portion of media content.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. Tangible, non-transitory computer-readable media having instructions encoded therein, wherein the instructions, when executed by a computing device, cause the computing device to perform functions comprising:

displaying in a graphical user interface (GUI), (i) a first volume icon corresponding to a first volume for a first playback device configured to play first audio content, (ii) a second volume icon corresponding to a second volume for a second playback device configured to play second audio content, and (iii) a first selectable icon for the first playback device and a second selectable icon for the second playback device;

receiving a first selection of the first selectable icon and a second selection of the second selectable icons via the GUI;

in response to receiving the first and second selections, (i) transmitting a command to the first playback device and the second playback device to form a synchrony group comprising the first and second playback devices, and (ii) displaying in the GUI, a group icon corresponding to the synchrony group;

receiving a third selection of the group icon; and in response to receiving the third selection, displaying in the GUI, a group volume icon corresponding to a group volume corresponding to the synchrony group that represents a position relative to the first and second volume icons, wherein (i) when the first volume icon indicates a volume greater than a volume indicated by the group volume icon, an adjustment to a position of the first volume icon causes an adjustment to a position of the group volume icon based on the adjustment to the position of the first volume icon, and (ii) when the second volume icon indicates a volume greater than the volume indicated by the group volume icon, an adjustment to a position of the second volume icon causes an adjustment to the position of the group volume icon based on the adjustment to the position of the second volume icon.

2. The tangible, non-transitory computer-readable media of claim 1, wherein the functions further comprise:

receiving a command to adjust the group volume icon; and in response to receiving the command to adjust the group volume icon, (i) adjusting a position of the first volume icon proportional to the adjustment to the group volume icon and changing the first volume consistent with the position of the first volume icon, and (ii) adjusting a position of the second volume icon proportional to the adjustment to the group volume icon and changing the second volume consistent with the position of the second volume icon.

3. The tangible, non-transitory computer-readable media of claim 1, wherein receiving a command to change the first volume when a volume level indicated by the first volume icon exceeds a group volume level indicated by the group volume icon comprises receiving a command via the GUI to adjust a position of the first volume icon.

4. The tangible, non-transitory computer-readable media of claim 1, wherein displaying in the GUI, the first volume icon corresponding to the first volume for the first playback device comprises displaying a first playback device icon corresponding to the first playback device, and wherein displaying in the GUI, the second volume icon corresponding to the second volume for the second playback device comprises displaying a second playback device icon corresponding to the second playback device.

5. The tangible, non-transitory computer-readable media of claim 1, wherein each of the first volume icon, second volume icon, and group volume icon comprise slider icons.

6. The tangible, non-transitory computer-readable media of claim 1, wherein the first volume is greater than the second volume, and wherein the group volume icon depicts a volume for the synchrony group that is greater than the second volume depicted by the second volume icon but less than the first volume depicted by the first volume icon.

7. The tangible, non-transitory computer-readable media of claim 1, wherein the first volume and second volume are independently adjustable via the first and second volume icons, respectively, and wherein the functions further comprise:

synchronously playing audio content via the first and second playback devices of the synchrony group.

8. The tangible, non-transitory computer-readable media of claim 7, wherein the functions further comprise, while synchronously playing the audio content via the first and second playback devices of the synchrony group:

receiving a command to change the first volume; and in response to receiving the command to change the first volume, changing the first volume, wherein after changing the first volume, a position of the group volume icon indicates a relative group volume of the synchrony group comprising the first playback device and the second playback device.

9. The tangible, non-transitory computer-readable media of claim 1, wherein receiving the first selection comprises receiving a selection of the first playback device from a plurality of playback devices available to be grouped into the synchrony group; and wherein receiving the second selection comprising receiving a selection of the second playback device from the plurality of playback devices available to be grouped into the synchrony group.

10. The tangible, non-transitory computer-readable media of claim 1, wherein the synchrony group consists of the first playback device and the second playback device, and wherein the functions further comprise:

initiating synchronous playback of the first audio content;

receiving one or more commands via the GUI to remove the second playback device from the synchrony group; and in response to receiving one or more commands via the GUI to remove the second playback device from the synchrony group, (i) configuring the second playback device to play second audio content, (ii) removing the group icon from the GUI, and (iii) removing the group volume icon from the GUI.

11. The tangible, non-transitory computer-readable media of claim 1, wherein the functions further comprise:

after receiving the first selection, displaying the first volume icon corresponding to the first playback device; and after receiving the second selection, displaying the second volume icon corresponding to the second playback device.

12. A method comprising:

displaying in a graphical user interface (GUI), (i) a first volume icon corresponding to a first volume for a first playback device configured to play first audio content, (ii) a second volume icon corresponding to a second volume for a second playback device configured to play second audio content, and (iii) a first selectable icon for the first playback device and a second selectable icon for the second playback device;

receiving a first selection of the first selectable icon and a second selection of the second selectable icons via the GUI;

in response to receiving the first and second selections, (i) transmitting a command to the first playback device and the second playback device to form a synchrony group comprising the first and second playback devices, and (ii) displaying in the GUI, a group icon corresponding to the synchrony group;

receiving a third selection of the group icon; and in response to receiving the third selection, displaying in the GUI, a group volume icon corresponding to a group volume corresponding to the synchrony group that represents a position relative to the first and second volume icons, wherein (i) when the first volume icon indicates a volume greater than a volume indicated by the group volume icon, an adjustment to a position of the first volume icon causes an adjustment to a position of the group volume icon based on the adjustment to the position of the first volume icon, and (ii) when the second volume icon indicates a volume greater than the volume indicated by the group volume icon, an adjustment to a position of the second volume icon causes an adjustment to the position of the group volume icon based on the adjustment to the position of the second volume icon.

13. The method of claim 12, further comprising:
receiving a command to adjust the group volume icon; and
in response to receiving the command to adjust the group volume icon, (i) adjusting a position of the first volume icon proportional to the adjustment to the group volume icon and changing the first volume consistent with the position of the first volume icon, and (ii) adjusting a position of the second volume icon proportional to the adjustment to the group volume icon and changing the second volume consistent with the position of the second volume icon.

14. The method of claim 12, wherein each of the first volume icon and the second volume icon comprise slider icons.

15. The method of claim 12, wherein the first volume is greater than the second volume, and wherein the group volume icon depicts a volume for the synchrony group that is greater than the second volume depicted by the second volume icon but less than the first volume depicted by the first volume icon.

16. The method of claim 12, wherein displaying in the GUI, the first volume icon corresponding to the first volume for the first playback device comprises displaying a first playback device icon corresponding to the first playback device, and wherein displaying in the GUI, the second volume icon corresponding to the second volume for the second playback device comprises displaying a second playback device icon corresponding to the second playback device.

17. The method of claim 12, wherein the first volume and second volume are independently adjustable via the first and second volume icons, respectively, and wherein the method further comprises:
synchronously playing audio content via the first and second playback devices of the synchrony group.

18. The method of claim 17, wherein while synchronously playing the audio content via the first and second playback devices of the synchrony group, the method further comprises:
receiving a command to change the first volume when a volume; and
in response to receiving the command to change the first volume, changing the first volume, wherein after changing the first volume, a position of the group volume icon indicates a relative group volume of the synchrony group comprising the first playback device and the second playback device.

19. A computing device, comprising:
one or more processors; and
tangible, non-transitory computer-readable memory storing instructions executable by the one or more processors such that the computing device is configured to:
display in a graphical user interface (GUI), (i) a first volume icon corresponding to a first volume for a first playback device configured to play first audio content, (ii) a second volume icon corresponding to a second volume for a second playback device configured to play second audio content, and (iii) a first selectable icon for the first playback device and a second selectable icon for the second playback device;
receive a first selection of the first selectable icon and a second selection of the second selectable icons via the GUI;
in response to receiving the first and second selections, (i) transmit a command to the first playback device and the second playback device to form a synchrony group comprising the first and second playback devices, and (ii) display in the GUI, a group icon corresponding to the synchrony group;
receive a third selection of the group icon; and
in response to receiving the third selection, display in the GUI, a group volume icon corresponding to a group volume corresponding to the synchrony group that represents a position relative to the first and second volume icons, wherein (i) when the first volume icon indicates a volume greater than a volume indicated by the group volume icon, an adjustment to a position of the first volume icon causes an adjustment to a position of the group volume icon based on the adjustment to the position of the first volume icon, and (ii) when the second volume icon indicates a volume greater than the volume indicated by the group volume icon, an adjustment to a position of the second volume icon causes an adjustment to the position of the group volume icon based on the adjustment to the position of the second volume icon.

20. The computing device of claim 19, wherein the instructions further comprise instructions executable by the one or more processors such that the computing device is further configured to:
receive a command to adjust the group volume icon; and
in response to receiving the command to adjust the group volume icon, (i) adjust a position of the first volume icon proportional to the adjustment to the group volume icon and changing the first volume consistent with the position of the first volume icon, and (ii) adjust a position of the second volume icon proportional to the adjustment to the group volume icon and changing the second volume consistent with the position of the second volume icon.

* * * * *